Figure 1:
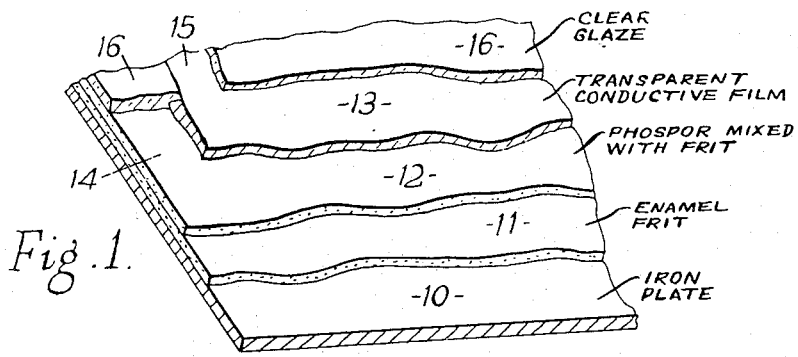

INVENTORS
PETER WHITTEN RANBY
DONALD WALTER TURNER
DOREEN YVONNE HOBBS

BY *Lawrence Burns*
ATTORNEY

United States Patent Office 3,215,847
Patented Nov. 2, 1965

3,215,847
ELECTROLUMINESCENT IMAGE-PRODUCING DEVICE
Peter Whitten Ranby, Donald Walter Turner, and Doreen Yvonne Hobbs, London, England, assignors to Thorn Electrical Industries Limited, London, England
Filed Aug. 5, 1960, Ser. No. 47,825
Claims priority, application Great Britain, Aug. 6, 1959, 26,957/59
4 Claims. (Cl. 250—217)

The present invention relates to electro-luminescent devices.

It is known that the brightness of light emitted by a suitable phosphor material when irradiated by X-rays can be increased by applying an alternating electric field to the material.

The present invention is based upon the discovery that when the phosphor material is of a suitable nature and is embedded in a suitable ceramic material and when the material is located in a unidirectional electric field of suitable strength, the phosphor material emits little or no light until excited by radiation of suitable wavelength or by cathode rays and, after being so excited and after the exciting radiation or cathode rays has ceased, will continue to emit light, at least for a substantial time, so long as the unidirectional electric field is maintained.

According to the present invention, therefore, there is provided an electro-luminescent device comprising a layer of phosphor embedded in a ceramic material disposed between two electrodes and means for maintaining a unidirectional potential difference between the electrodes, the phosphor and ceramic layer being such that, when the unidirectional potential difference is applied between the electrodes, it emits substantially no light until it is excited by radiation or cathode rays. When emission of light is required one or both of the electrodes is made transparent.

The term "ceramic" in this specification is intended to include vitreous materials such as enamels and glazes.

Suitable compositions for the ceramic layers are described in the specifications of British Patents Nos. 733,260 and 773,997, both together corresponding to U.S. Patent 3,103,607, issued September 10, 1963 to R. M. Rulon, and of British patent applications Nos. 1,460/56, 39,067/56 and 36,226/57, corresponding respectively to British Patents 815,270, 830,225 and 815,721, and to U.S. Patents 2,824,992, 2,851,374 and 2,919,249.

Among luminescent phosphor materials which are suitable are zinc sulphide and zinc cadmium sulphide activated by manganese and halide ions and prepared by a heat treatment. Examples are:

(1) 90 grams ZnS
    1 gram MnS
    10 grams $MgCl_2 6H_2O$
    3 grams NaCl are mixed into a paste with distilled water, dried, ground and then heated in a closed silica tube at 1100° C. for 1 hour. When cool the product is washed, dried and sieved.

(2) 70 grams ZnS
    30 grams CdS
    0.4 grams MnS
    3 grams $BaCl_2$ anhyd.

are intimately mixed together and heated in a closed silica tube at 1100° C. for 1 hour. The product is washed, dried and sieved.

(3) The method of Example 1 is modified by reducing the amount of ZnS to 55 grams and adding 44 grams of CdS.

Figure 2:
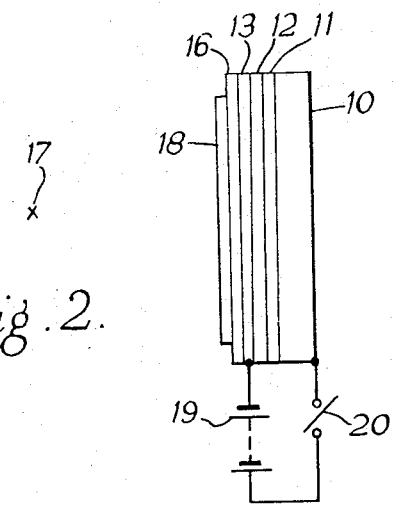
Figure 3:
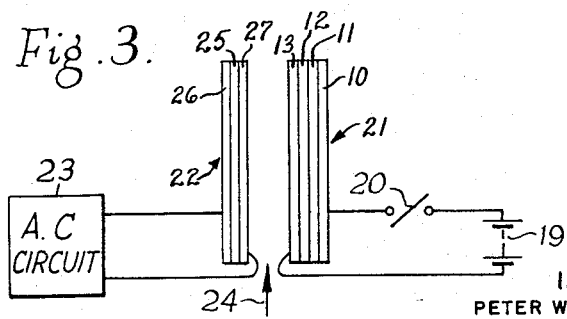

The invention will be described with reference to the accompanying drawing in which FIG. 1 is a cut-away view in perspective, much enlarged, of one device according to the invention, FIG. 2 is a view in elevation showing one way in which a device according to the invention can be used, and FIG. 3 is a schematic diagram of an embodiment of the invention used in conjunction with a photo-conductive device.

One method of producing a device according to the present invention, using the luminescent material of Example 2, will be described with reference to FIG. 1.

A 5" x 4" piece of flat enamelling iron 10 having a thickness 0.025" is thoroughly cleaned and dried. This is uniformly sprayed on one side with an aqueous suspension of an enamel frit 11, such that when dry and heated at 800° C. for 5 minutes it has a uniform layer of enamel with a coating weight of 0.13 gram/sq. inch. When cool, this side of the plate is uniformly sprayed with an aqueous suspension of an enamel glaze 12 and the luminescent material of Example 2 mixed in the ratio 72:28 parts by weight so that after drying and heating at 670° C. for 2 minutes a layer with a coating weight of 0.03 gram/sq. inch has been applied. As soon as the last heating process is complete and before the plate has appreciably cooled, it is sprayed with an alcoholic solution of stannic chloride which has the effect of rendering the surface of the enamelled plate electrically conducting by forming a nearly transparent film 13. The enamelled plate is now treated as at 14 around its edges in order to remove the conducting film on the enamel close to the edge, and so isolate the metal plate 10 and the conducting surface 13 that they may function as two separate electrodes. This treatment around the edges may be a sand blasting or scoring treatment which has the effect of breaking the continuity of the conducting film. Provided a small contact area 15 on this conducting film is left uncovered, a further layer 16 of clear glaze can be applied to the plate as a protective coating.

Suitable enamel frits and glazes are described, for example, in the specification of British Patent No. 733,260.

A device constructed as described has a high resistance to direct current between its electrodes 10 and 13 in the absence of an exciting radiation. When a suitable unidirectional potential difference is maintained between the electrodes, the device is capable of being excited by radiation over a wide band of frequencies from visible light to X-rays, or by cathode rays, and when excited emits light of orange colour. The exciting radiation has the effect of lowering the resistance of the phosphor/ceramic layer. After the exciting radiation has been removed the device continues to emit light at least for a considerable time, provided the unidirectional potential difference is maintained. When the potential difference is removed, the resistance returns to its original high value, and light emission ceases and will not recommence until the device is again excited by radiation while the unidirectional potential difference is being applied between the electrodes.

Devices according to the invention can be operated over a wide range of direct voltages, for example from about 25 volts up to several hundred volts, the brightness of the light emitted increasing with increase in voltage. The optimum voltage is dependent upon the thickness of the phosphor/ceramic layer and upon the dielectric properties of this layer.

One example of the use of a device according to the invention shown in FIG. 2 is to apply a suitable potential difference from a battery 19 between the electrodes 10 and 13 in the dark and to expose the phosphor/ceramic layer 12 briefly through the transparent layer to suitable exciting radiation 17 (such as that from a photoflash bulb or X-rays) passing through a photographic negative 18. When the negative is removed the device emits light in the form of an image of the photographic negative. This light emission continues provided the unidirectional potential difference is maintained but ceases when the switch 20 is opened and the potential difference is thus removed. The device is then in a condition to receive a further image.

The device may be constructed in the form of an X-ray screen. The X-rays acting as exciting radiation need not be applied continuously but may be intermittent. There is the great advantage that after a brief exposure to X-rays the image formed will remain visible provided the unidirectional potential difference is maintained.

The invention may be used for many purposes other than those already mentioned, for instance in a cathode ray tube to retain a trace on the screen thereof, in so-called "memory tubes," or in radiant energy intensification systems.

Devices according to the invention can also be used in combination with photo-conducting material, such as cadmium sulphide 25, as shown in FIG. 3 in suitable circuits to provide electrical switching devices.

One example of such a combination is shown in FIG. 3 and comprises a device 21 which may be as described with reference to FIG. 1. The device 21 is arranged with its transparent electrode 13 facing and spaced from a photo-conductive device 22 which has its two plates 26, 27 connected into an alternating current circuit shown in block form at 23. The battery 19 and the switch 20 correspond to the battery and switch shown in FIG. 2.

It is arranged that normal, ambient light entering the space between the devices 21 and 22 is insufficient to cause the device 21 to emit light when the switch 20 is closed. Similarly the ambient light reaching the device 22 is insufficient to lower its resistance appreciably.

When, however, a flash of light enters the space between the devices 21 and 22 as indicated by the arrow 24 the device 21 emits light as previously described and continues to do so until the switch 20 is opened. The flash of light is made of insufficient duration to affect the resistance of the photoconductive device 22 but the steady light from the device 21 causes the resistance of the photoconductive device to fall to a low value.

Thus the device 22 acts as a switch which is switched on by the flash of light and can be switched off by opening the switch 20.

Cells prepared according to the above description and using phosphors as described in the examples tend to show a slight ordinary D.C. electro-luminescence especially when operated at voltages above about 200 v. or at temperatures above room temperature. This ordinary D.C. electroluminescence provides a weak background illumination (which does not depend on radiation stimulation) which tends to detract from the sensitivity of the image-reproducing characteristics of the cell.

We have found that this ordinary D.C. electroluminescent effect is very greatly reduced if a trace of gold is incorporated in the phosphor during the phosphor preparation. Using phosphors as prepared in the given examples, the proportion of gold incorporated in the mixture before heating should lie between 0 and 0.1% by weight. If the proportion of gold is too high the radiation-sensitised D.C. electroluminescent properties are also reduced, hence it is preferred to use an amount of gold between 0.0001 and 0.01% by weight.

Although specific reference has been made to examples in which the phosphor/ceramic layer and the electrodes are flat, they may be of any desired shape according to requirements. Moreover, although in the construction described with reference to FIGURE 1 the base-plate 10 is of iron, the base-plate may be of a sheet of aluminium or an electrically conducting and substantially transparent glass. In these cases somewhat different frits are required because of the different thermal expansion characteristics of the different base-plates.

We claim:
1. An electroluminescent device comprising two electrodes at least one of which is light transmitting, a layer between said electrodes, said layer comprising an electroluminescent phosphor embedded in a ceramic material, means for maintaining a unidirectional potential difference between said electrodes, said layer emitting substantially no light in the absence of irradiation thereof, and means for irradiating said layer through said light transmitting electrode to cause emission of light from said layer while said potential difference is maintained.

2. A device according to claim 1, wherein the phosphor and ceramic layer includes gold.

3. A device according to claim 2, wherein the proportion of gold is between 0.0001 and 0.01% by weight.

4. An electroluminescent device as claimed in claim 1 in combination with a photoconductive device to receive light emitted by the electroluminescent device and a source of light of short duration to excite the electroluminescent device.

References Cited by the Examiner

UNITED STATES PATENTS

| | | | |
|---|---|---|---|
| 2,650,310 | 8/53 | White. | |
| 2,721,808 | 10/55 | Roberts et al. | |
| 2,768,310 | 10/56 | Kazan et al. | |
| 2,774,737 | 12/56 | Mager. | |
| 2,880,346 | 3/59 | Nicoll et al. | |
| 2,909,692 | 10/59 | Cusano | 313—108 |
| 2,948,823 | 8/60 | Wasserman. | |
| 2,951,814 | 9/60 | Destriau. | |
| 2,952,792 | 9/60 | Yhap. | |
| 2,980,817 | 4/61 | Gaiser. | |
| 3,010,044 | 11/61 | Cerulli | 313—108 |
| 3,015,036 | 12/61 | Butler | 313—108 X |
| 3,043,987 | 7/62 | Michlin | 315—26 |

GEORGE N. WESTBY, *Primary Examiner.*

RALPH G. NILSON, *Examiner.*